(12) United States Patent
Tiwari et al.

(10) Patent No.: US 12,548,175 B2
(45) Date of Patent: Feb. 10, 2026

(54) METHOD AND SYSTEM FOR ESTIMATING TEMPORALLY CONSISTENT 3D HUMAN SHAPE AND MOTION FROM MONOCULAR VIDEO

(71) Applicant: Tata Consultancy Services Limited, Mumbai (IN)

(72) Inventors: Lokender Tiwari, New Delhi (IN); Sushovan Chanda, Kolkata (IN); Hrishav Bakul Barua, Kolkata (IN); Brojeshwar Bhowmick, Kolkata (IN); Avinash Sharma, Hyderabad (IN); Amogh Tiwari, Hyderabad (IN)

(73) Assignee: Tata Consultancy Services Limited, Mumbai (IN)

( * ) Notice: Subject to any disclaimer, the term of this patent is extended or adjusted under 35 U.S.C. 154(b) by 286 days.

(21) Appl. No.: 18/390,472

(22) Filed: Dec. 20, 2023

(65) Prior Publication Data

US 2024/0338834 A1    Oct. 10, 2024

(30) Foreign Application Priority Data

Apr. 10, 2023   (IN) .............................. 202321026563

(51) Int. Cl.
  *G06T 7/50*    (2017.01)
  *G06T 7/246*   (2017.01)
  (Continued)

(52) U.S. Cl.
  CPC .............. *G06T 7/50* (2017.01); *G06T 7/246* (2017.01); *G06T 7/73* (2017.01); *G06V 10/44* (2022.01)

(58) Field of Classification Search
  CPC .. G06T 7/50; G06T 7/246; G06T 7/73; G06T 2207/10016; G06T 2207/20084; G06T 2207/30196; G06V 10/44
  See application file for complete search history.

(56) References Cited

U.S. PATENT DOCUMENTS

| 12,288,360 B2 * | 4/2025 | Ostadabbas ............... G06T 7/50 |
| 2017/0316578 A1 * | 11/2017 | Fua .......................... G06T 7/246 |
| 2024/0261971 A1 * | 8/2024 | Qin ........................ B25J 9/1612 |

FOREIGN PATENT DOCUMENTS

CN           114581945 A       6/2022

OTHER PUBLICATIONS

Luo, Zhengyi, S. Alireza Golestaneh, and Kris M. Kitani. "3d human motion estimation via motion compression and refinement." Proceedings of the Asian Conference on Computer Vision. 2020.*

(Continued)

*Primary Examiner* — Shefali D Goradia
(74) *Attorney, Agent, or Firm* — Finnegan, Henderson, Farabow, Garrett & Dunner, LLP

(57) ABSTRACT

Estimating temporally consistent 3D human body shape, pose, and motion from a monocular video is a challenging task due to occlusions, poor lightning conditions, complex articulated body poses, depth ambiguity, and limited availability of annotated data. Embodiments of present disclosure provide a method for temporally consistent motion estimation from monocular video. A monocular video of person(s) is captured by a weak perspective camera and spatial features of body of the persons are extracted from each frame of the video. Then, initial estimates of body shape, body pose, and features of the weak perspective camera are obtained. The spatial features and initial estimates are then aggregated to obtain spatio-temporal features by a combination of self-similarity matrices between the spatial features, pose and the camera and self-attention maps of the camera features and the spatial features. The spatio-temporal aggregated features are then used to predict shape and pose parameters of the person(s).

15 Claims, 9 Drawing Sheets

(51) Int. Cl.
*G06T 7/73* (2017.01)
*G06V 10/44* (2022.01)

(56) References Cited

OTHER PUBLICATIONS

Gomes, Thiago, et al. "Do as I do: Transferring human motion and appearance between monocular videos with spatial and temporal constraints." Proceedings of the IEEE/CVF Winter Conference on Applications of Computer Vision. 2020.*

Tekin, Bugra, et al. "Direct prediction of 3d body poses from motion compensated sequences." Proceedings of the IEEE conference on computer vision and pattern recognition. 2016.*

Wei, Wen-Li, et al. "Capturing humans in motion: Temporal-attentive 3D human pose and shape estimation from monocular video." Proceedings of the IEEE/CVF Conference on Computer Vision and Pattern Recognition. 2022.*

D. C. Luvizon et al. "Scene-Aware 3D Multi-Human Motion Capture from a Single Camera," 2023, arxiv, https://arxiv.org/pdf/2301.05175.pdf.

* cited by examiner

METHOD AND SYSTEM FOR ESTIMATING TEMPORALLY CONSISTENT 3D HUMAN SHAPE AND MOTION FROM MONOCULAR VIDEO

PRIORITY CLAIM

This U.S. patent application claims priority under 35 U.S.C. § 119 to: Indian patent application Ser. No. 202321026563, filed on Apr. 10, 2023. The entire contents of the aforementioned application are incorporated herein by reference.

TECHNICAL FIELD

The present invention generally relates to the field of image analysis and, more particularly, to a method and system for estimating temporally consistent 3D human shape and motion from monocular video.

BACKGROUND

Estimating 3-Dimensional (3D) human body shape, pose, and motion from a monocular video is an important task that has tremendous applications in augmented/virtual reality, healthcare, gaming, sports analysis, human-robot interaction in virtual environments, virtual try on, etc. A lot of work has been done in estimating 3D body shape and pose from a single image by learning to regress the explicit 3D skeleton or parametric 3D body model (e.g., Skinned Multi Person Linear model (SMPL)). However, many applications such as human motion analysis, sports analytics, behavior analysis, etc., critically depend on the temporal correctness of the human motion where single image based methods fail drastically. Temporally consistent 3D human pose, motion, and shape estimation from a monocular video is a challenging task due to occlusions, poor lighting conditions, complex articulated body poses, depth ambiguity, and limited availability of annotated data.

Recent efforts on monocular video based motion estimation typically introduce a Convolutional Neural Network (CNN) or Recurrent Neural Network (RNN) module to perform spatio-temporal feature aggregation from neighboring frames followed by regression of SMPL parameters, thus modelling relatively local temporal coherence. However, these methods tend to fail when capturing long-term temporal dynamics and show poor performance when the body is under partial occlusion. Some of the recent works also attempt to model the generative space of motion modelling using Conditional Variational Auto-Encoders (VAEs), often followed by a global, non-learning based optimization at inference time using the entire video. Such global optimization is also used in a very recent work (Ailing Zeng et. al. Smoothnet: A plug-and-play network for refining human poses in videos. In *European Conference on Computer Vision*. Springer, 2022) with a plug and play post-processing step for improving the existing methods by exploiting long-term temporal dependencies for human motion estimation. Due to the post-processing over the entire sequence, these methods find limited applicability.

Another recent work, MPS-Net (Wen-Li Wei et. al. Capturing humans in motion: temporal attentive 3d human pose and shape estimation from monocular video. In *Proceedings of the IEEE/CVF Conference on Computer Vision and Pattern Recognition*, pages 13211-13220, 2022) attempts to attain a good balance between local to global temporal coherence using a MOtion Continuity Attention (MOCA) module were made. More specifically, MPS-Net explicitly models the visual feature similarity across RGB frames of the monocular video and uses it to guide the learning of the self-attention module for spatio-temporal feature learning. MOCA enables focusing on adaptive neighborhood range for identifying the motion continuity dependencies. This is followed by a Hierarchical Attentive Feature Integration (HAFI) module to achieve local to global temporal feature aggregation through which they achieve the state of the art performance. Nevertheless, similar to majority of the existing methods, MPS-Net uses RESNET kind of generic deep features extracted from the RGB frames. However, it does not exploit the prior knowledge of human appearance that the 3D human body has-a fixed topology and a well-defined geometric model (e.g., SMPL). Additionally, unlike other methods, MPS-Net does not exploit the initialization from per-frame shape and pose predictions. In fact, the HAFI module seems redundant in wake of the ability of Normalized Self-Similarity Metric (NSSM) and self-attention (already existing in MOCA) modules for temporal aggregation of features. Finally, MPS-Net only performs per-frame prediction using the aggregated spatio-temporal features, thereby completely neglecting the joint-estimation performed by existing methods.

SUMMARY

Embodiments of the present disclosure present technological improvements as solutions to one or more of the above-mentioned technical problems recognized by the inventors in conventional systems. For example, in one embodiment, a method for estimating temporally consistent 3D human shape and motion from monocular video is provided. The method includes obtaining a monocular video of one or more persons captured by a weak perspective camera. The monocular video comprises of a plurality of frames captured at a plurality of time windows. Further the method includes extracting a plurality of spatial features of body of the one or more persons from the plurality of frames using a body-aware feature extractor and obtaining one or more initial estimates of a) body shape of the one or more persons, b) pose of the one or more persons, and c) a set of features of the weak perspective camera from each of the plurality of frames. The method further includes performing temporal aggregation of the plurality of spatial features of body and the initial estimates of the body shape, the pose of the one or more persons, and the set of features of the weak perspective camera obtained from each of the plurality of frames over the plurality of time windows to obtain a plurality of spatio-temporal features associated with each of the plurality of frames over each of the plurality of time windows. Furthermore, the method includes predicting an updated body shape of the one or more persons, an updated pose of the one or more persons, and an updated set of features of the weak perspective camera for each of the plurality of frames based on the associated plurality of spatio-temporal features.

In another aspect, a system for estimating temporally consistent 3D human shape and motion from monocular video is provided. The system includes: a memory storing instructions; one or more communication interfaces; and one or more hardware processors coupled to the memory via the one or more communication interfaces, wherein the one or more hardware processors are configured by the instructions to: obtain a monocular video of one or more persons captured by a weak perspective camera. The monocular video comprises of a plurality of frames captured at a plurality of time windows. Further the one or more hardware processors are configured to extract a plurality of spatial features of body of the one or more persons from the plurality of frames using a body-aware feature extractor and obtaining one or more initial estimates of a) body shape of the one or more persons, b) pose of the one or more persons, and c) a set of features of the weak perspective camera from each of the plurality of frames. The one or more hardware processors are further configured to perform temporal aggregation of the plurality of spatial features of body and the initial estimates of the body shape, the pose of the one or more persons, and the set of features of the weak perspective camera obtained from each of the plurality of frames over the plurality of time windows to obtain a plurality of spatio-temporal features associated with each of the plurality of frames over each of the plurality of time windows. Furthermore, the one or more hardware processors are configured to predict an updated body shape of the one or more persons, an updated pose of the one or more persons, and an updated set of features of the weak perspective camera for each of the plurality of frames based on the associated plurality of spatio-temporal features.

In yet another aspect, there are provided one or more non-transitory machine-readable information storage mediums comprising one or more instructions which when executed by one or more hardware processors cause a method for estimating temporally consistent 3D human shape and motion from monocular video. The method includes obtaining a monocular video of one or more persons captured by a weak perspective camera. The monocular video comprises of a plurality of frames captured at a plurality of time windows. Further the method includes extracting a plurality of spatial features of body of the one or more persons from the plurality of frames using a body-aware feature extractor and obtaining one or more initial estimates of a) body shape of the one or more persons, b) pose of the one or more persons, and c) a set of features of the weak perspective camera from each of the plurality of frames. The method further includes performing temporal aggregation of the plurality of spatial features of body and the initial estimates of the body shape, the pose of the one or more persons, and the set of features of the weak perspective camera obtained from each of the plurality of frames over the plurality of time windows to obtain a plurality of spatio-temporal features associated with each of the plurality of frames over each of the plurality of time windows. Furthermore, the method includes predicting an updated body shape of the one or more persons, an updated pose of the one or more persons, and an updated set of features of the weak perspective camera for each of the plurality of frames based on the associated plurality of spatio-temporal features.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following embodiments described herein.

Figure 4:
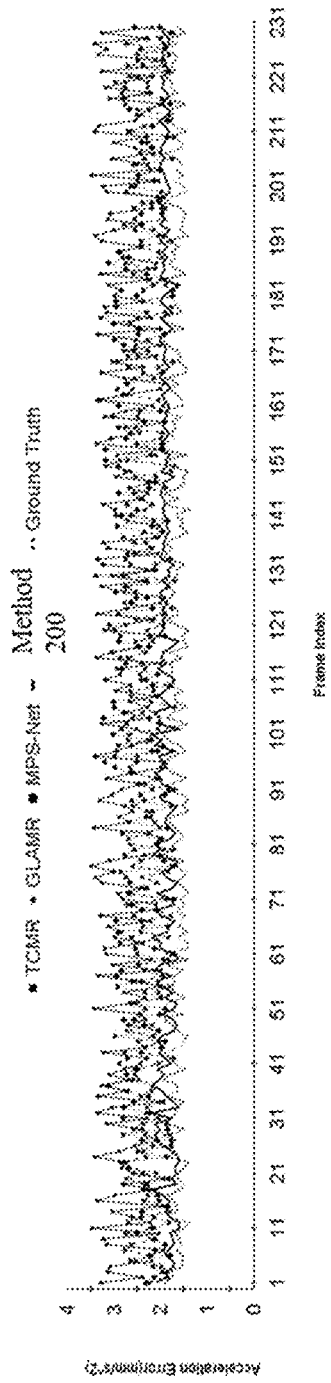
FIG. 4 is a graph comparing acceleration errors of method of FIG. 2 with state-of-the-art methods, according to some embodiments of the present disclosure.

Estimating temporally consistent 3D human body shape, pose, and motion from a monocular video is a challenging task due to (self-) occlusions, poor lightning conditions, complex articulated body poses, depth ambiguity, and limited availability of annotated data. In order to overcome these challenges, embodiments of present disclosure provide a method for temporally consistent motion estimation from monocular video. The disclosed method obtains a monocular video of one or more person(s) captured by a weak perspective camera and extracts spatial features of body of the persons from each frame of the video. Then, initial estimates of body shape, pose and features of the weak perspective camera are obtained from each of the frames. The spatial features and initial estimates are then aggregated to obtain spatio-temporal features for each of the frames by computing a combination of self-similarity and the self-attention mechanism. While the self-similarity between the spatial features in a time window of the video helps to correlate the body parts across frames even in the presence of occlusion, the self-similarity among the pose parameters and the camera reveals the continuity of the human motion along with the camera consistency. In addition, a self-attention map of the camera parameters and the spatial features of the body are used to find the range adaptively which is important to capture the temporal smoothness. Together, they yield long horizon context through the spatio-temporal aggregated features for every frame by considering remaining past and future frames. These features are then used to predict coarse shape and pose parameters of the person(s), which are further refined using an LSTM. Experimental results on the publicly available benchmark data show that the disclosed method attains significantly lower acceleration error as illustrated in FIG. 4 and outperforms the existing state-of-the-art in complicated scenarios like partial occlusion, complex poses and relatively low illumination.

Referring now to the drawings, and more particularly to FIGS. 1 to 8, where similar reference characters denote corresponding features consistently throughout the figures, there are shown preferred embodiments and these embodiments are described in the context of the following exemplary system and/or method.

Figure 1:
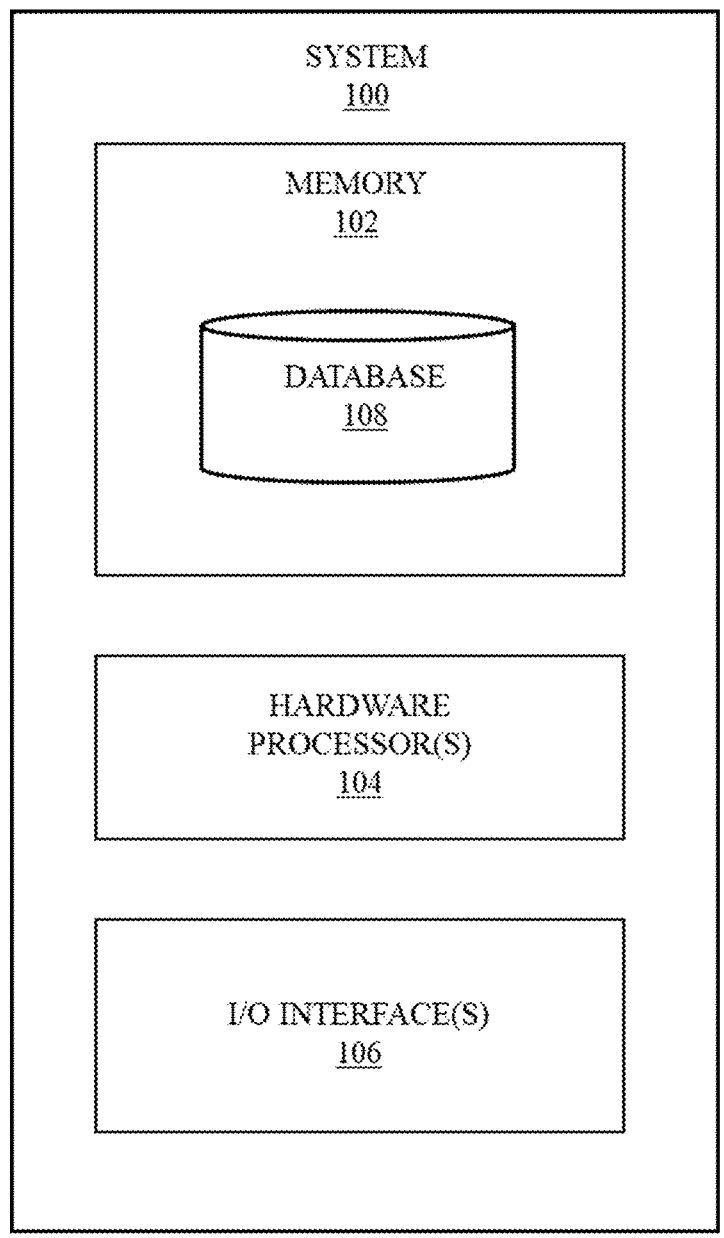
FIG. 1 illustrates an exemplary block diagram of a system for estimating temporally consistent 3D human shape and motion from monocular video, according to some embodiments of the present disclosure.

FIG. 1 illustrates an exemplary block diagram of a system for estimating temporally consistent 3D human shape and motion from monocular video, according to some embodiments of the present disclosure. In an embodiment, the system 100 includes one or more processors (104), communication interface device(s) (106) or Input/Output (I/O) interface(s) (106) or user interface (106), and one or more data storage devices or memory (102) operatively coupled to the one or more processors (104). The one or more processors (104) that are hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud, and the like.

The I/O interface device(s) (106) can include a variety of software and hardware interfaces, for example, a web interface, a graphical user interface, and the like and can facilitate multiple communications within a wide variety of networks and protocol types, including wired networks, for example, LAN, cable, etc., and wireless networks, such as WLAN, cellular, or satellite. In an embodiment, the I/O interface device(s) (106) receives a material as input and gives property of the material as output.

The memory (102) may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. Functions of the components of system 100 are explained in conjunction with flow diagram depicted in FIGS. 2 and 3, and experimental results illustrated in FIGS. 4 through 8 for estimating temporally consistent 3D human shape and motion from monocular video.

Figure 2:
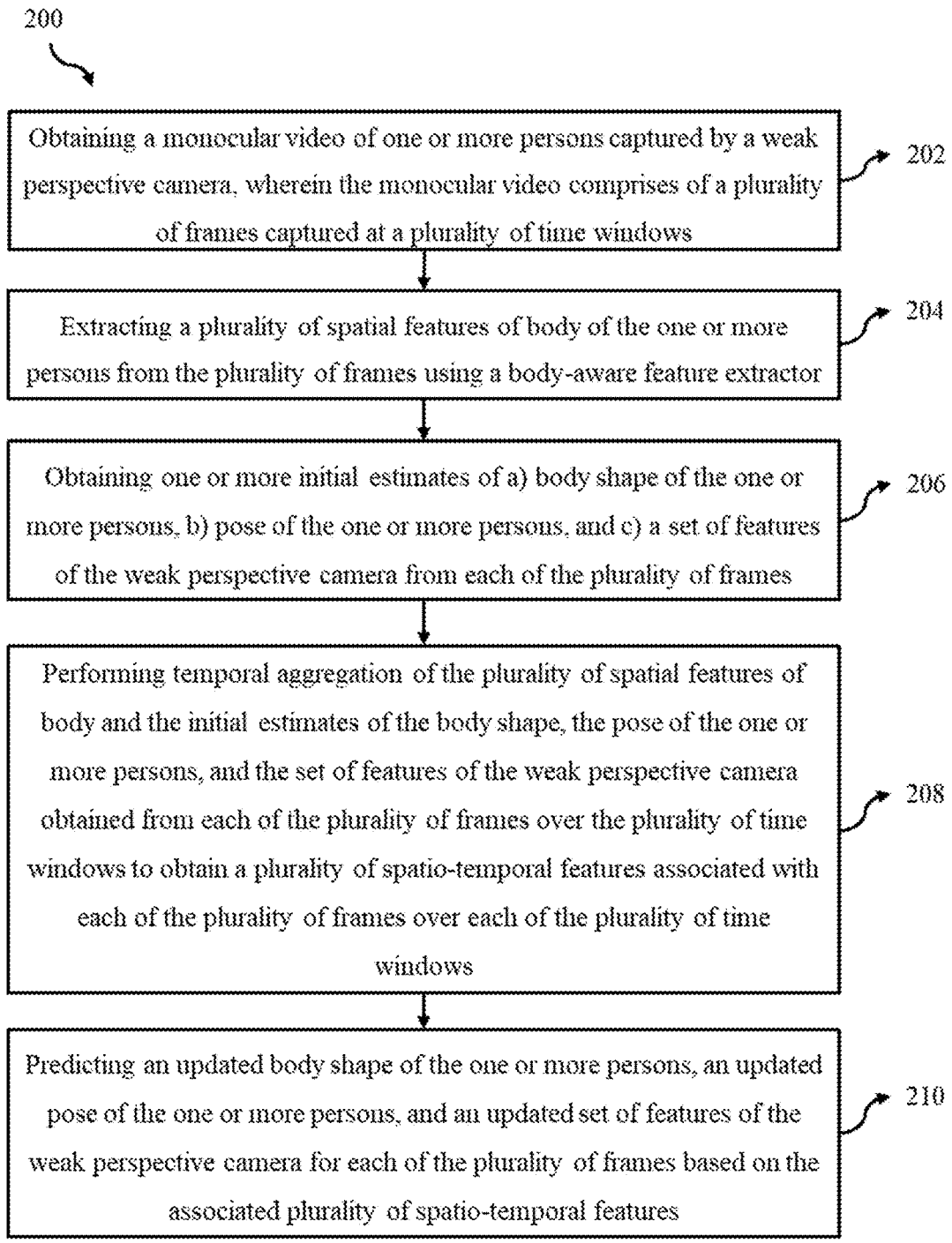
FIG. 2 is a flow diagram illustrating method for estimating temporally consistent 3D human shape and motion from monocular video, according to some embodiments of the present disclosure.
Figure 3A:
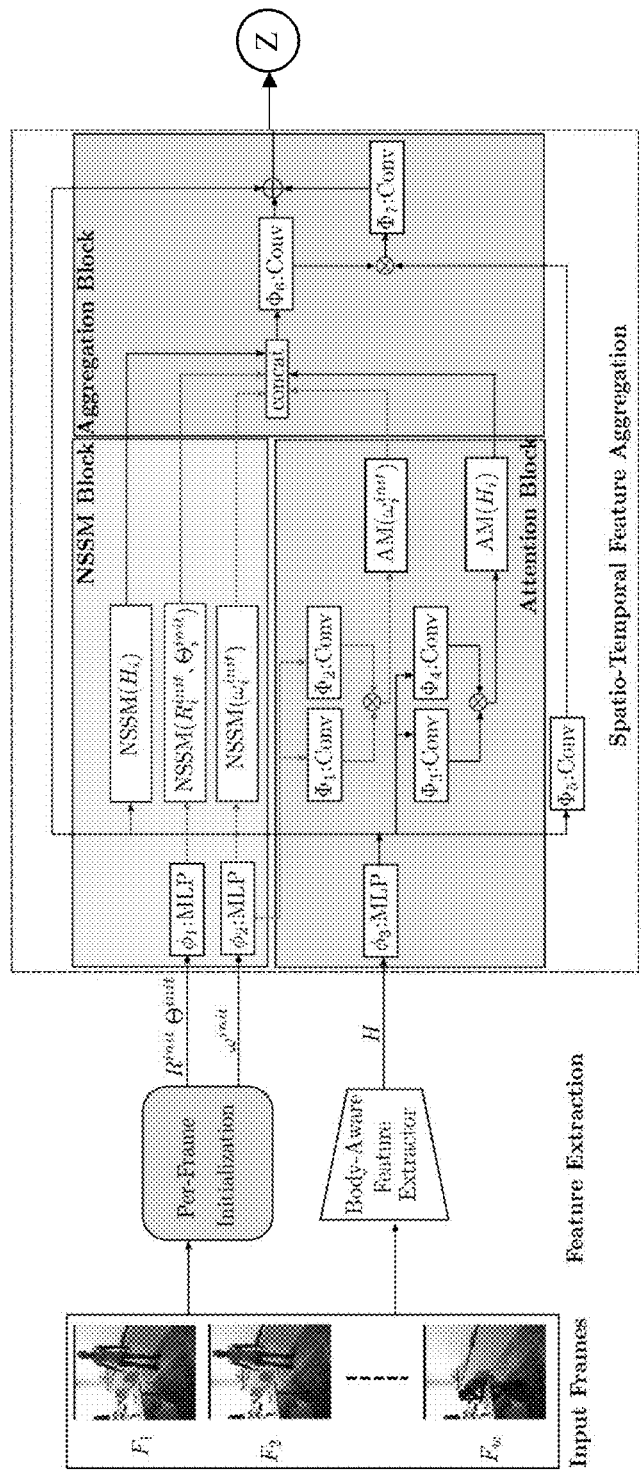
FIGS. 3A and 3B, collectively referred as FIG. 3, is an architecture diagram illustrating implementation of system of FIG. 1, according to some embodiments of the present disclosure.
Figure 3B:
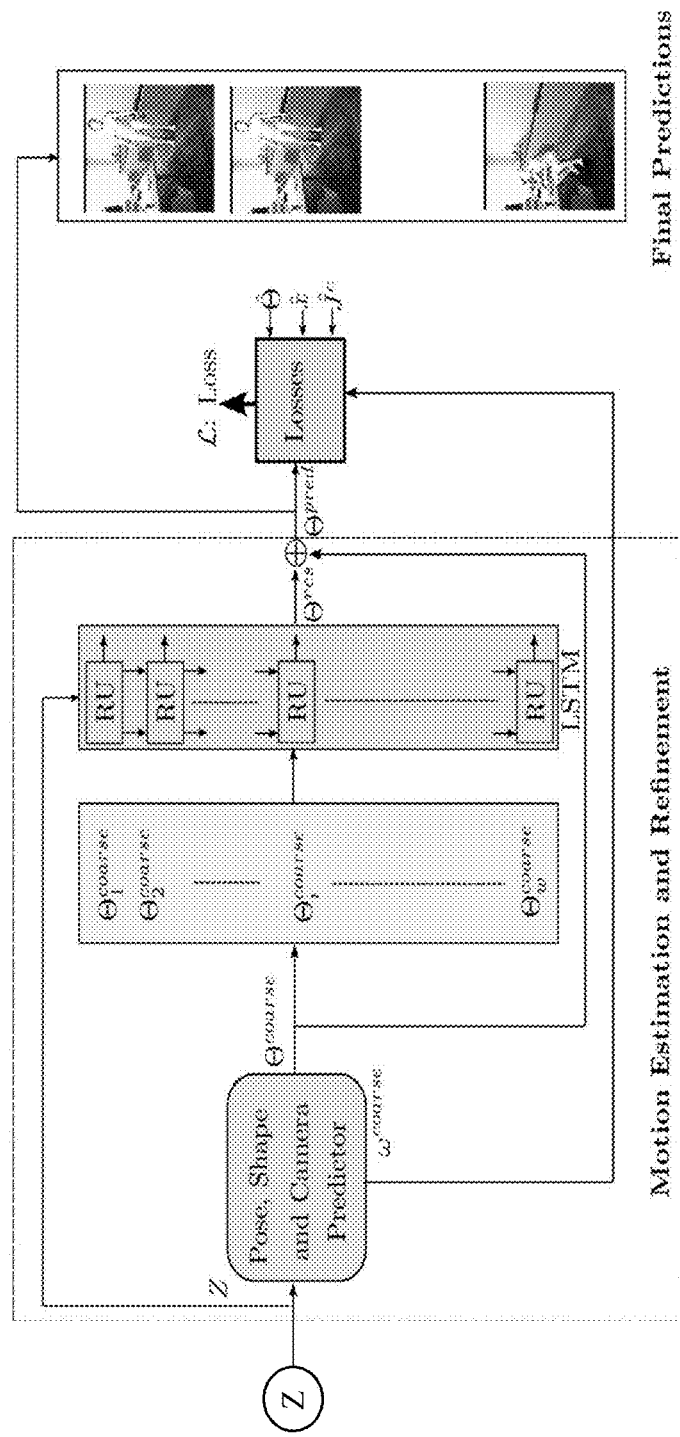

In an embodiment, the system 100 comprises one or more data storage devices or the memory (102) operatively coupled to the processor(s) (104) and is configured to store instructions for execution of steps of the method (200) depicted in FIGS. 2 and 3 by the processor(s) or one or more hardware processors (104). The steps of the method of the present disclosure will now be explained with reference to the components or blocks of the system 100 as depicted in FIG. 1, the steps of flow diagrams as depicted in FIGS. 2 and 3 and experimental results illustrated in the FIGS. 4 through 8. Although process steps, method steps, techniques or the like may be described in a sequential order, such processes, methods, and techniques may be configured to work in alternate orders. In other words, any sequence or order of steps that may be described does not necessarily indicate a requirement that the steps to be performed in that order. The steps of processes described herein may be performed in any order practical. Further, some steps may be performed simultaneously.

FIG. 2 is a flow diagram illustrating a method 200 for estimating temporally consistent 3D human shape and motion from monocular video, according to some embodiments of the present disclosure. At step 202 of the method 200, the one or more hardware processors (104) are configured to obtain a monocular video (alternatively referred as video) of one or more persons captured by a weak perspective camera. The monocular video comprises a plurality of frames corresponding to a plurality of time windows of size W. The video can be mathematically represented as $V=\{F_i\}_{i=1}^{N}$ where N is number of frames and $F_i$ represents the $i^{th}$ frame among the plurality of frames. The objective of the method 200 is to estimate Skinned Multi Person Linear model (SMPL) based human body motion and shape parameters for each frame, i.e. $\Theta_i^{pred}=\{T_i, R_i, \theta_i, \beta_i\}$. Here, $T_i$, $R_i$, $\theta_i$ are the pose parameters where $T_i \in \mathbb{R}^3$ and $R_i \in \mathbb{R}^3$ represent translation and rotation (in axis-angle format) of the root joint (which is chosen to be the pelvis in SMPL model) and $\theta_i \in \mathbb{R}^{23 \times 3}$ represents the relative rotations of the remaining 23 joints. $\beta_i \in \mathbb{R}^{10}$ represents body shape parameters.

Once the monocular video is obtained, at step 204 of the method 200, a plurality of spatial features of the body of the one or more persons are extracted from the plurality of frames using a body-aware feature extractor illustrated in FIG. 3. Unlike existing methods which use per-frame generic RESNET kind of deep features, the method 200 extracts Continuous Surface Embeddings (CSE) to learn body aware feature representation for obtaining dense correspondences across frames. CSE predicts, for each pixel in a 2D image, an embedding vector of the corresponding vertex in the object (human) mesh, therefore establishing dense correspondences between image pixels and 3D mesh surface even in presence of severe illumination conditions and (self-) occlusions. The spatial features $H=\{H_i\}_{i=1}^{N}$ are extracted from the plurality of frames $F_i$ according to equation 1, where $\psi$ represents the body-aware feature extractor which is a pre-trained CSE encoder and $H_i \in \mathbb{R}^{112 \times 112 \times 16}$.

$$H_i = \psi(F_i) \qquad (1)$$

Further, at step 206 of the method 200, one or more initial estimates of (a) body shape of the one or more persons, (b) pose of the one or more persons, and (c) a set of features of the weak perspective camera are obtained from each of the plurality of frames. In an embodiment, the steps 204 and 206 can be executed in parallel as illustrated in FIG. 3. The step 206 is performed in per-frame initialization block of FIG. 3. Specifically, the step 206 obtains $\Theta_i^{init}=\{T_i, R_i, \theta_i, \beta_i\}$ for each $i^{th}$ frame and camera features $\omega_i^{init} \in \mathbb{R}^4$. In an embodiment, a technique called PARE (Muhammed Kocabas et. al. PARE: Part attention regressor for 3D human body estimation. In *Proceedings of the IEEE/CVF International Conference on Computer Vision*, pages 11127-11137, 2021) is used for obtaining the initial estimates. PARE is one of the frame-based state-of-the-art methods that can predict human pose and shape by using a soft body-part-guided attention mechanism. PARE's part-guided attention mechanism overcomes occlusion issues by exploiting information from the visible individual body parts and neighbouring body parts to predict occluded parts of the body. PARE yields a 3×3 rotation matrix representation for each joint in the body of the person. It is further converted into a 6-dimensional vector representation which is then flattened into a single 144-dimensional vector to recover body pose as: $[R_i, \theta_i] \in \mathbb{R}^{144}$.

Further, at step 208 of the method 200 temporal aggregation of the plurality of spatial features of body and the initial estimates of the body shape, the pose of the one or more persons and the set of features of the weak perspective camera obtained from each of the plurality of frames over the plurality of time windows to obtain a plurality of spatio-temporal features associated with each of the plurality of frames over each of the plurality of time windows. The step 208 is depicted in the spatio-temporal feature aggregation block of FIG. 3. Initially, three Normalized Self Similarity Matrices (NSSM), each of size {W×W}, are computed for (i) the plurality of spatial features (NSSM (H)), (ii) initial estimates of the body shape and pose of the one or more persons (NSSM ([R, θ])), and (iii) initial estimates of the weak perspective camera (NSSM ($\omega^{init}$)), respectively. As depicted in FIG. 3, computation of NSSMs is done using Multi-Layer Perceptron (MLP) $\phi_1$, $\phi_2$ and $\phi_3$. More specifically, $[R_i, \theta_i]$ and $\omega^{init}$ are uplifted to 512 dimensions using linear layers $\phi_1$ and $\phi_2$ and the spatial feature $H_i$ is transformed to 2048 dimensions using $\phi_3$. These multiple NSSMs help in correlating the frames based upon body parts appearance, body pose, and cameras thereby giving robustness to occlusions as well as revealing the continuity of the human motion along with the camera consistency. Once the NSSMs are computed, self-attention maps of the spatial features of body (AM (H)) and the initial estimates of the weak perspective camera (AM ($\omega^{init}$)) are computed. As depicted in FIG. 3, this step is performed using MLP $\phi_2$ and $\phi_3$ and convolution layers $\Phi_1$, $\Phi_2$, $\Phi_3$, and $\Phi_4$. First the spatial features $H_i \in \mathbb{R}^{112 \times 112 \times 16}$ are transformed to 2048 dimension using the linear layer $\phi_3$, and later down sampled to $\mathbb{R}^{N \times 1024}$ by using two different 1×1 convolution layers $\Phi_3$ and $\Phi_4$ to obtain AM (H). Similarly, the initial camera estimates are first uplifted to 512 dimension vector using the MLP $\phi_2$ and subsequently process it through two different 1×1 convolution layers $\Phi_1$ and $\Phi_2$. This self-attention on the camera parameters and the body-aware features help in adaptively finding the range which is important to capture the temporal smoothness. In an embodiment, computation of NSSMs and self-attention maps maybe performed in parallel. Once the NSSMs and self-attention maps are computed, they are concatenated to obtain spatio-temporal features of the frame. This is repeated for all the plurality of frames within a time window to get a W×W×5 tensor, which is then resized to W×W matrix using a 1×1 convolution layer ($\Phi_6$). This W×W matrix represents consolidated similarity between frames across the time window. This feature is subsequently multiplied with the down-sampled spatial features $H_i$ (of 1024 dimension obtained by $\Phi_5$) and the result is then uplifted (using convolution layer $\Phi_7$) to get $Y \in \mathbb{R}^{W \times 2048}$. Thus, together, they yield spatio-temporal aggregated features for every frame by considering remaining past and future frames inside the corresponding time window. The per-frame temporally aggregated feature $Y_i$ is finally added to the spatial features $H_i$ to get the spatio-temporally aggregated features $Z_i$ for i-th frame according to equation 2.

$$Z_i = H_i + Y_i \qquad (2)$$

Once the spatio-temporal features of each of the plurality of frames are calculated, at step 210 of the method 200, an updated body shape of the one or more persons, an updated pose of the one or more persons, and an updated set of features of the weak perspective camera are predicted for each of the plurality of frames based on the associated plurality of spatio-temporal features according to equation 3. Here, $\Theta_i^{coarse} \in \mathbb{R}^4$ is the updated body shape and pose (alternatively referred as coarse SMPL pose and shape) in $i^{th}$ frame, $\omega_i^{coarse} \in \mathbb{R}^{85}$ represents updated set of features of the weak-perspective camera in $i^{th}$ frame and g represents SMPL and camera predictor network as depicted in FIG. 3.

$$\Theta_i^{coarse}, \omega_i^{coarse} = g(Z_i) \qquad (3)$$

In an embodiment, the coarse SMPL pose, shape and parameters of the weak-perspective camera are refined using a Long Short Term Memory (LSTM) to obtain final estimates of shape and motion of body of the one or more persons in the monocular video. The LSTM $\zeta$ takes the spatio-temporal features $Z_i$ and coarse SMPL pose and shape $\Theta_i^{coarse}$ as input and predicts a residual $\Theta_i^{res} \in \mathbb{R}^{85}$ which is subsequently added to $\Theta_i^{coarse}$ in order to refine shape and pose of body of the one or more persons in the monocular video. This step of refining can be mathematically represented by equations 4 and 5.

$$\Theta_i^{res} = \zeta(Z_i, \Theta_i^{coarse}) \qquad (4)$$

$$\Theta_i^{pred} = \Theta_i^{coarse} + \Theta_i^{res} \qquad (5)$$

In an embodiment, the method 200 is repeated for a plurality of epochs using sample videos for training the models (CSE predictor $\psi$, SMPL and camera predictor network g and the LSTM $\zeta$) used in the method 200. During training, a loss between final predicted shape and pose of body and actual shape and pose of body in the sample video is calculated at each epoch based on which the models are updated. The loss is calculated using loss functions on body shape and pose ($L_{SMPL}$), 3D joint coordinates ($L_{3D}$), and 2D joint coordinates ($L_{2D}$) obtained with predicted weak perspective camera ($\omega^{coarse}$). They are calculated according to equations 6, 7 and 8 respectively and the total loss is given by equation 9. In equation 6, $\beta_i$ and $\{R_i, \Theta_i\}$ are predicted shape and pose parameters for the frame and $\hat{\beta}_i$ and $\{\hat{R}_i, \hat{\theta}_i\}$ represents corresponding ground truth. In equation 7, $J_i^c$ represents predicted 3D joint coordinates for the $i^{th}$ frame and $\hat{J}_i^c$ are the corresponding ground-truth 3D joint coordinates. In equation 8, $\hat{x}_i$ represents ground truth 2D key points for ith frame and $\Pi$ represents 3D-2D projection matrix obtained from the predicted camera parameters $\omega^{coarse}$.

$$L_{SMPL} = \lambda_{shape} \|\hat{\beta}_i - \beta_i\|_2 + \lambda_{pose} \|\{\hat{R}_i, \hat{\theta}_i\} - \{R_i, \theta_i\}\|_2 \quad (6)$$

$$L_{3D} = \|\hat{J}_i^c - J_i^c\|_2 \quad (7)$$

$$L_{2D} = \|\hat{x}_i - \prod(J_i^c)\|_2 \quad (8)$$

$$L_{final} = \lambda_1 L_{SMPL} + \lambda_2 L_{3D} + \lambda_3 L_{2D} \quad (9)$$

EXPERIMENTS AND RESULTS

Datasets: For training, a mix of datasets with 2D and 3D ground truth are used. Official training splits of Human3.6M (Catalin Ionescu, Dragos Papava, Vlad Olaru, and Cristian Sminchisescu. Human3. 6m: Large scale datasets and predictive methods for 3D human sensing in natural environments. *IEEE transactions on pattern analysis and machine intelligence*, 36 (7): 1325-1339, 2013), MPI-INF-3DHP (Dushyant Mehta, Helge Rhodin, Dan Casas, Pascal Fua, Oleksandr Sotnychenko, Weipeng Xu, and Christian Theobalt. Monocular 3d human pose estimation in the wild using improved cnn supervision. In 2017 *international conference on 3D vision (3DV)*, pages 506-516. IEEE, 2017), and 3DPW (Timo Von Marcard, Roberto Henschel, Michael J Black, Bodo Rosenhahn, and Gerard Pons-Moll. Recovering accurate 3d human pose in the wild using imus and a moving camera. In *Proceedings of the European conference on computer vision (ECCV)*, pages 601-617, 2018) are the 3D datasets used for training. InstaVariety (Angjoo Kanazawa, Jason Y Zhang, Panna Felsen, and Jitendra Malik. Learning 3d human dynamics from video. In *Proceedings of the IEEE/CVF conference on computer vision and pattern recognition*, pages 5614-5623, 2019) and Pose-Track (Mykhaylo Andriluka, Umar Iqbal, Eldar Insafutdinov, Leonid Pishchulin, Anton Milan, Juergen Gall, and Bernt Schiele. PoseTrack: A benchmark for human pose estimation and tracking. In *Proceedings of the IEEE conference on computer vision and pattern recognition*, pages 5167-5176, 2018) are the 2D Datasets used for training. During testing all the methods are tested on the official test splits of Human3.6M, MPI-INF-3DHP, and 3DPW.

Evaluation Metrics: Mean Per Joint Position Error (MPJPE), Procrustes analysis-Mean Per Joint Position Error (PA-MPJPE) and acceleration error (ACC-ERR) are used as the evaluation metrics.

Training Details: All the techniques listed in Table 1 are trained on the above-specified training dataset, except GLAMR, as it uses only 3D datasets for training. In addition to Human3.6M, MPI-INF-3DHP, and 3DPW, GLAMR also uses AMASS dataset. For the predictor, pre-trained SPIN regressor is used and the weights are refurbished by Adam Optimizer. The SMPL parameter regressor MLP is used to predict pose, shape, and camera parameters for each frame. The initial learning rate is set to $5 \times 10^{-5}$ and is reduced by a factor of 10 every time the 3D pose accuracy does not improve for 5 consecutive epochs. The mini-batch size is set to 32 and the number of layers in LSTM is 3 and the number of epochs is 500. DATA_2D_RATIO is set to 0.4 and the sequence length to 16.

Comparison with State of The Art (SOTAs) methods: Method 200 is compared with relevant video based human pose, shape, and motion estimation methods: (i) VIBE (Muhammed Kocabas, Nikos Athanasiou, and Michael J Black. Vibe: Video inference for human body pose and shape estimation. In *Proceedings of the IEEE/CVF conference on computer vision and pattern recognition*, pages 5253-5263, 2020), (ii) MEVA (Zhengyi Luo, S Alireza Golestaneh, and Kris M Kitani. 3d human motion estimation via motion compression and refinement. In *Proceedings of the Asian Conference on Computer Vision*, 2020), (iii) GLAMR (Ye Yuan, Umar Iqbal, Pavlo Molchanov, Kris Kitani, and Jan Kautz. Glamr: Global occlusion aware human mesh recovery with dynamic cameras. In *Proceedings of the IEEE/CVF conference on computer vision and pattern recognition*, pages 11038-11049, 2022), (iv) TCMR (Hongsuk Choi, Gyeongsik Moon, Ju Yong Chang, and Kyoung Mu Lee. Beyond static features for temporally consistent 3d human pose and shape from a video. In *Proceedings of the IEEE/CVF conference on computer vision and pattern recognition*, pages 1964-1973, 2021), (v) MPS-Net (Wen-Li Wei, Jen-Chun Lin, Tyng-Luh Liu, and HongYuan Mark Liao. Capturing humans in motion: temporal attentive 3d human pose and shape estimation from monocular video. In *Proceedings of the IEEE/CVF Conference on Computer Vision and Pattern Recognition*, pages 13211-13220, 2022), and (vi) D&D (Jiefeng Li, Siyuan Bian, Chao Xu, Gang Liu, Gang Yu, and Cewu Lu. D&d: Learning human dynamics from dynamic camera. In *European Conference on Computer Vision*, 2022).

Quantitative results: Tables 1A, 1B and 1C reports the MPJPE (mm), PA-MPJPE (mm) and Acceleration Error (mm/s$^2$) of competing methods implemented on Human 3.6M, 3DPW, and MPI-INF-3DHP datasets respectively. Best is in bold; second best is underlined. The SOTA methods for the comparisons and the corresponding performance values are taken from MPS-Net as the training and test data split is consistent with the evaluation protocol. In addition to that, a global test-time optimization based method GLAMR is compared with method 200. The reported results show that the method 200 outperforms the existing methods in all of the metrics and datasets significantly (except the acceleration error in Human 3.6M). This shows that the spatio-temporal feature aggregation module powered by the body-aware feature and independent pose estimation is indeed helpful to compute better pose and shape estimation and at the same time yields better temporal continuity by considering past and future frames. A recent method D&D is also compared with method 200 using the training and testing splits of 3DPW dataset used by them. Qualitative results in Table 1D shows that the method 200 outperform D&D in all metrics with a significant margin. This conveys superiority of the method 200 in modelling spatio-temporal coherence in comparison to D&D which does an explicit dynamic camera modelling.

TABLE 1A

| | Human 3.6M | | |
|---|---|---|---|
| Method | PA-MPJPE↓ | MPJPE ↓ | ACC-ERR↓ |
| VIBE | 53.3 | 91.9 | 25.4 |
| MEVA | 53.2 | 76.0 | 15.3 |
| GLAMR | 47.6 | <u>67.7</u> | 6.0 |
| MPS-Net | <u>47.4</u> | 69.4 | 3.6 |
| TCMR | 52.0 | 73.6 | <u>3.9</u> |
| Method 200 | 42.6 | 66.4 | 4.1 |

TABLE 1B

| | 3DPW | | | |
|---|---|---|---|---|
| Method | PA-MPJPE↓ | MPJPE↓ | MPVPE↓ | ACC-ERR↓ |
| VIBE | 57.6 | 93.5 | 113.4 | 27.1 |
| MEVA | 54.7 | 86.9 | — | 11.6 |
| GLAMR | 51.1 | 73.6 | — | 8.9 |
| MPS-Net | 52.1 | 84.3 | 99.7 | 7.4 |
| TCMR | 52.7 | 86.5 | 103.2 | 6.8 |
| Method 200 | 49.3 | 67.3 | 91.2 | 5.4 |

TABLE 1C

| | MPI-INF-3DHP | | |
|---|---|---|---|
| Method | PA-MPJPE↓ | MPJPE↓ | ACC-ERR↓ |
| VIBE | 68.9 | 97.7 | 29.0 |
| MEVA | 65.4 | 96.4 | 11.1 |
| GLAMR | — | — | — |
| MPS-Net | 62.8 | 96.7 | 9.6 |
| TCMR | 63.5 | 97.6 | 8.5 |
| Method 200 | 58.7 | 93.3 | 8.1 |

TABLE 1D

| Methods | PA-MPJPE | MPJPE | ACC-ERR |
|---|---|---|---|
| D&D | 42.7 | 73.7 | 7.0 |
| Method 200 | 39.1 | 71.6 | 5.2 |

Figure 5A:
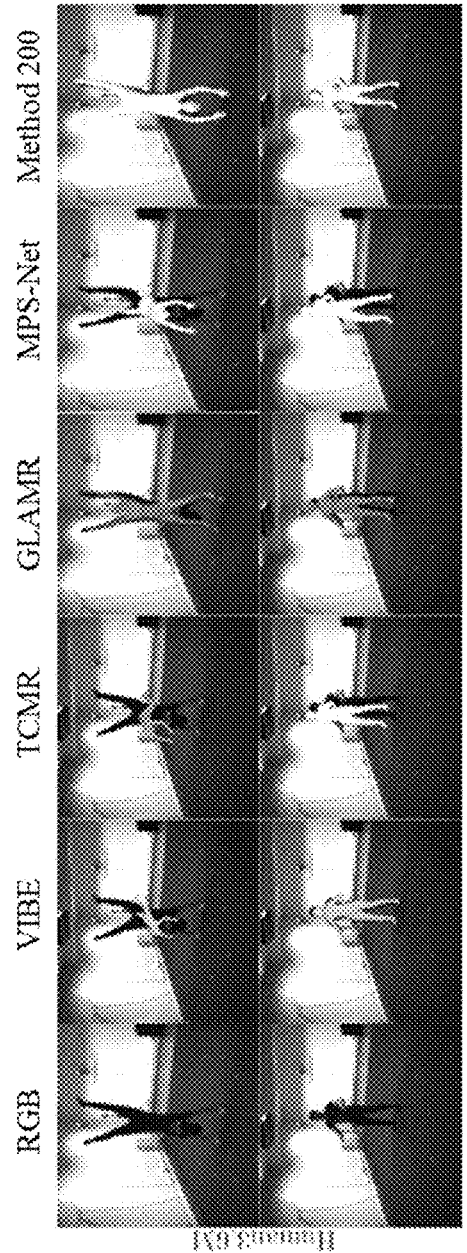
FIGS. 5A, 5B and 5C illustrate qualitative comparison of estimated pose overlayed on the frames of the sample videos using method of FIG. 2 and existing methods applied on Human3.6M, 3DPW and MPI-INF-3DHP datasets, respectively, according to some embodiments of the present disclosure.
Figure 5B:
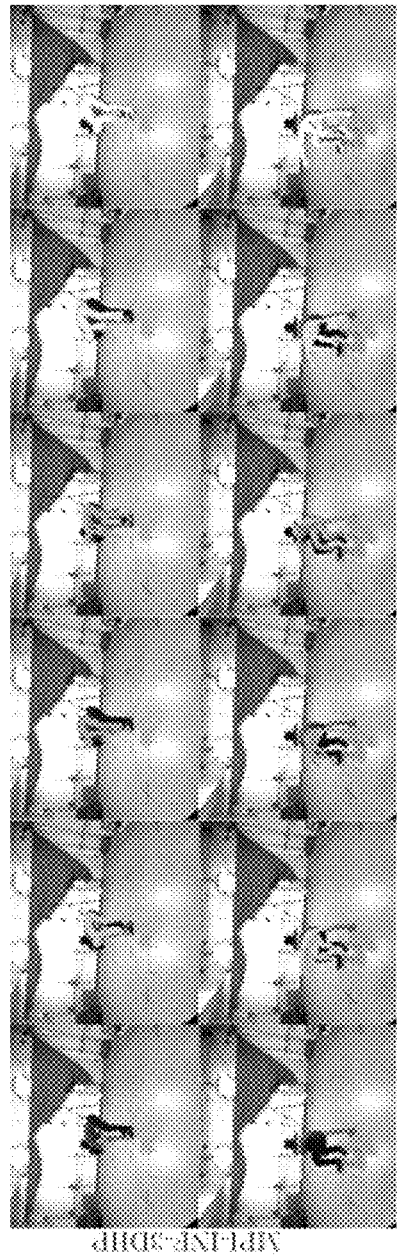
Figure 5C:
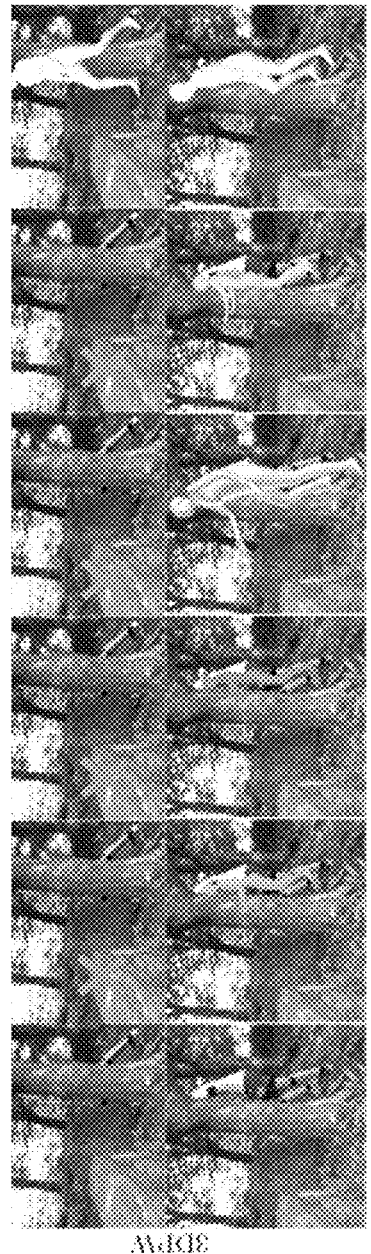
Figure 8:
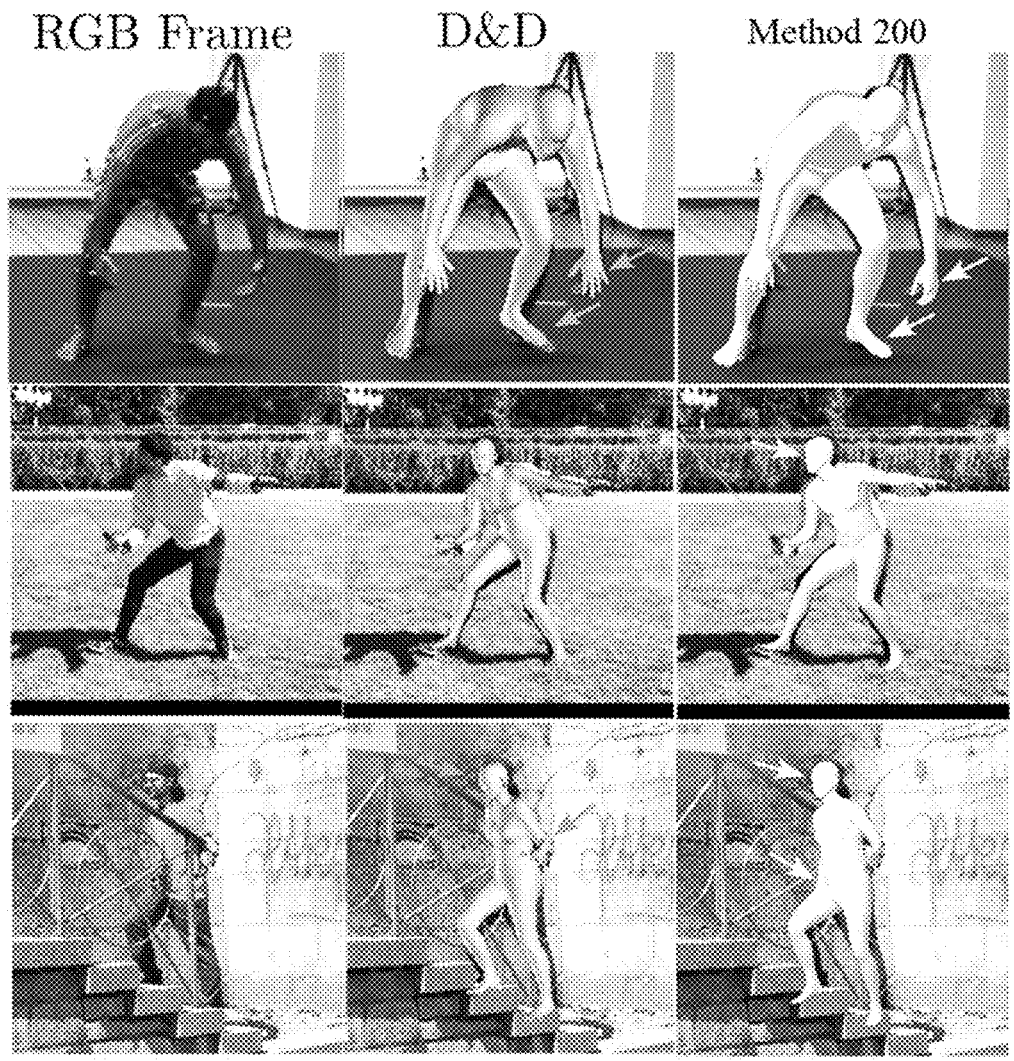
FIG. 8 illustrates qualitative comparison of method of FIG. 2 with one of the existing methods, according to some embodiments of the present disclosure.

Qualitative results: method 200 is visually compared against VIBE, TCMR, GLAMR, and MPS-Net as shown in FIGS. 5A, 5B and 5C for Human 3.6M, 3DPW, and MPI-INF-3DHP datasets respectively. It can be observed that in the first row of FIG. 5A, for a complex pose under a poor illumination, method 200 recovers significantly better body pose compared to the SOTAs. Similarly, in the second row of FIG. 5A, it is evident that the pose and shape estimations are more accurate from the method 200 resulting in better projection overlap. Interestingly, VIBE also produces reasonable pose, but pose estimation of method 200 is superior to VIBE. In the FIG. 5C, even more challenging situations are selected where the human body is partially occluded. The results show that method 200 can handle occlusion significantly better than the considered SOTAs. In the fifth row, none of the SOTA methods is able to produce any output, where our method produces a legitimate body pose. In the first row of FIG. 5C, the degree of occlusion is less and hence GLAMR, and MPS-Net have produced the poses, albeit incorrect, whereas the result from method 200 is significantly better than them and correlates with the RGB observation. In addition to the aforementioned methods, method 200 is also compared with a very recent work D&D. However, their official code is not available to extensively evaluate the method in different datasets and therefore few frames from their supplementary material are selected for the comparison. FIG. 8 shows that method 200 reveals the accurate reconstruction in the different body parts compared to D&D's reconstruction. Efficacy of the method 200 in all the above challenging scenarios can be attributed to the carefully designed spatio-temporal feature aggregator module. Moreover, the presence of the body-aware feature helps to reconstruct the finer details.

Figure 6:
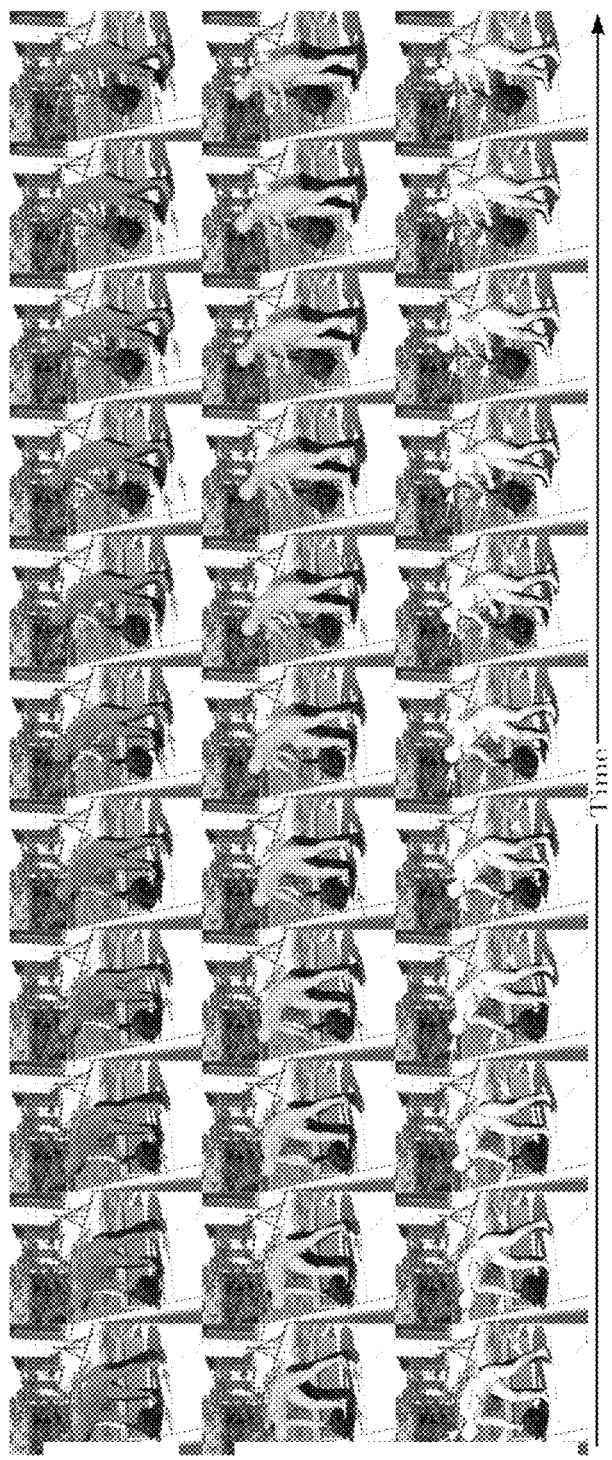
FIG. 6 illustrates qualitative result of method of FIG. 2 and existing methods on a sample sequence of 3DPW dataset, according to some embodiments of the present disclosure.

Further, temporal consistency of the method 200 is shown in FIG. 6. MPS-Net, a window based method and GLAMR, a global optimization based refinement method, are selected for the comparisons. It is evident that the head orientation and the affinity of the hand to the bag is consistent in the method 200. Moreover, the fitting of SMPL in the method 200 is also significantly better compared to the SOTA.

Figure 7:
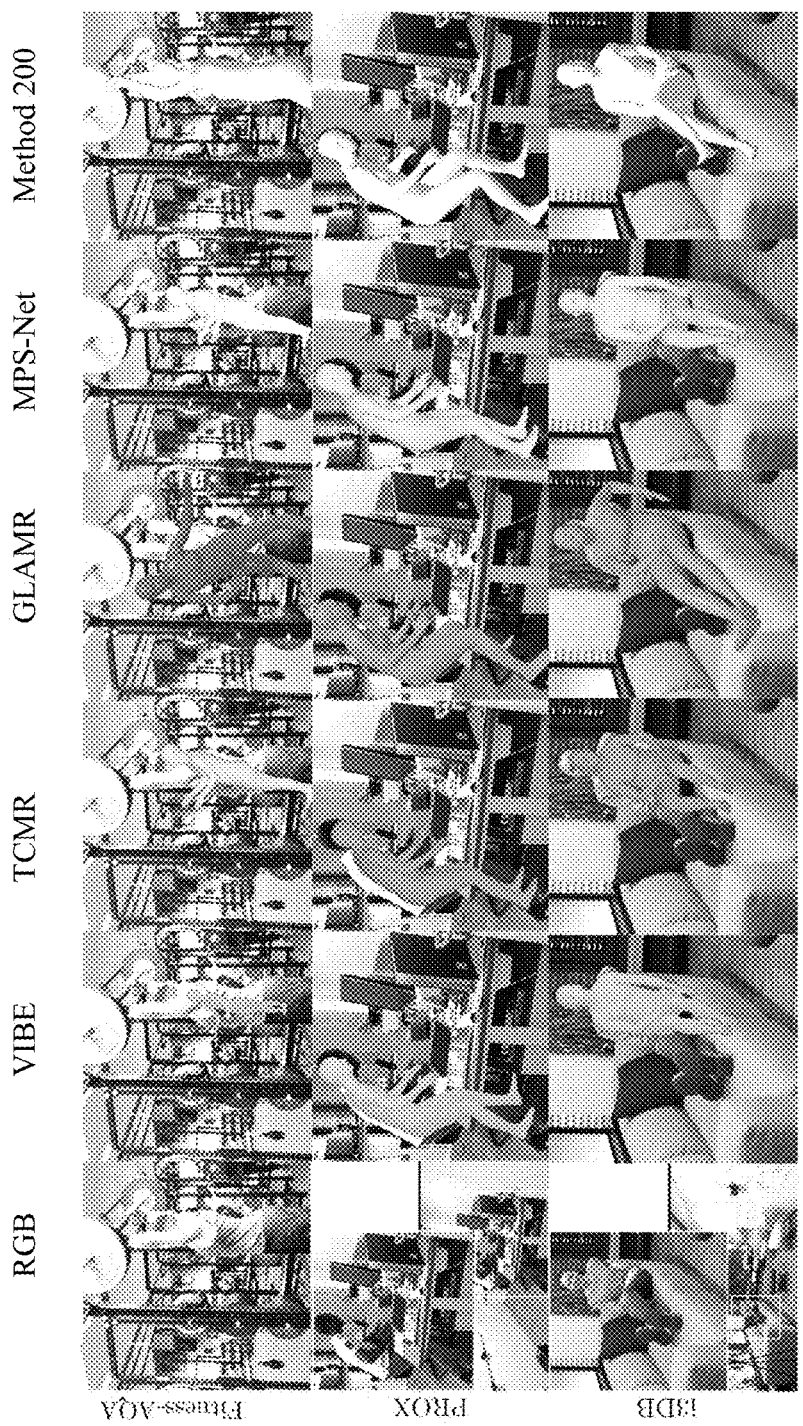
FIG. 7 illustrates qualitative comparison of method of FIG. 2 with existing methods on out-of-distribution datasets- Fitness-AQA, PROX and i3DB, according to some embodiments of the present disclosure.

Generalization results: To evaluate method 200 for generalization ability, results on i3DB, PROX, and FitnessAQA datasets are additionally reported. These datasets are out of the training data distribution and also belong to diverse scenarios. FIG. 7 shows the qualitative results on these dataset where the method 200 outperforms the SOTA in the reconstruction of partial body and the complicated poses significantly. The images for the PROX and i3DB is zoomed for better viewing but in the estimation the original images are used. This shows that method 200 reconstructed the body well even it is relatively far from the camera.

Ablation study: The effect of various design choices of method 200 are studied in the ablation study. It is performed using the full scale experiments on all the three key datasets- Human3.6M, 3DPW, and MPI-INF-3DHP. Various versions of the feature aggregation and their performances are reported in the Table 2. It is to be noted that having self-similarity map of camera parameters, pose parameters, and body-aware features along with attention map of camera parameters and body-aware features yield better results, which is further improved after the refinement step using LSTM (last row of table 2). The temporal feature integration module (HAFI) proposed in MPS-Net is also tested. Instead of LSTM HAFI module is used and the report the numbers in Table 2. It can be observed that adding HAFI increases the MPJPE and acceleration error in all the three datasets. This shows that spatio-temporal feature aggregation followed by joint pose refinement with LSTM as performed by method 200 is sufficient enough to capture the spatio-temporal relationships.

TABLE 2

| | Human3.6M | | 3DPW | | MPI-INF-3DHP | |
|---|---|---|---|---|---|---|
| Variants | MPJPE | ACC-ERR | MPJPE | ACC-ERR | MPJPE | ACC-ERR |
| Baseline | 73.5 | 4.6 | 84.3 | 7.4 | 96.7 | 9.6 |
| NSSM([R, θ]) + NSSM(H) + AM($\omega^{init}$) + AM(H) | 69.2 | 4.17 | 70.43 | 5.76 | 93.60 | 8.27 |
| NSSM($\omega^{init}$) + NSSM(H) + AM([R, θ]) + AM(H) | 74.0 | 4.61 | 73.09 | 5.84 | 95.70 | 8.37 |
| NSSM($\omega^{init}$) + NSSM(H) + NSSM([R, θ]) + AM($\omega^{init}$) + AM(H) | 68.9 | 4.21 | 67.92 | 5.78 | 93.91 | 8.26 |
| NSSM($\omega^{init}$) + NSSM(H) + AM([R, θ]) + AM($\omega^{init}$) + AM(H) | 70.1 | 4.24 | 70.43 | 5.83 | 93.79 | 8.47 |
| NSSM($\omega^{init}$) + NSSM(H) + NSSM([R, θ]) + AM([R, θ]) + AM($\omega^{init}$) + AM(H) | 71.8 | 4.31 | 70.31 | 5.96 | 94.15 | 8.40 |
| NSSM($\omega^{init}$) + NSSM(H) + NSSM([R, θ]) + AM($\omega^{init}$) + AM(H) + HAFI | 75.7 | 4.13 | 77.60 | 5.79 | 98.31 | 8.39 |

TABLE 2-continued

| Variants | Human3.6M | | 3DPW | | MPI-INF-3DHP | |
|---|---|---|---|---|---|---|
| | MPJPE | ACC-ERR | MPJPE | ACC-ERR | MPJPE | ACC-ERR |
| NSSM($\omega^{init}$) + NSSM(H) + NSSM([R, θ]) + AM($\omega^{init}$) + AM(H) + LSTM | 66.4 | 4.10 | 67.30 | 5.40 | 93.30 | 8.10 |

The written description describes the subject matter herein to enable any person skilled in the art to make and use the embodiments. The scope of the subject matter embodiments is defined herein and may include other modifications that occur to those skilled in the art. Such other modifications are intended to be within the scope of the present disclosure if they have similar elements that do not differ from the literal language of the embodiments or if they include equivalent elements with insubstantial differences from the literal language of the embodiments described herein.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means, and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method comprising:
obtaining, via one or more hardware processors, a monocular video of one or more persons captured by a weak perspective camera, wherein the monocular video comprises of a plurality of frames captured at a plurality of time windows;
extracting, via the one or more hardware processors, a plurality of spatial features of body of the one or more persons from the plurality of frames using a body-aware feature extractor;
obtaining, via the one or more hardware processors, one or more initial estimates of a) body shape of the one or more persons, b) pose of the one or more persons, and c) a set of features of the weak perspective camera from each of the plurality of frames;
performing, via the one or more hardware processors, temporal aggregation of the plurality of spatial features of body and the initial estimates of the body shape, the pose of the one or more persons, and the set of features of the weak perspective camera obtained from each of the plurality of frames over the plurality of time windows to obtain a plurality of spatio-temporal features associated with each of the plurality of frames over each of the plurality of time windows; and
predicting, via the one or more hardware processors, an updated body shape of the one or more persons, an updated pose of the one or more persons, and an updated set of features of the weak perspective camera for each of the plurality of frames based on the associated plurality of spatio-temporal features.

2. The method of claim 1, wherein the updated body shape of the one or more persons, the updated pose of the one or more persons, and the updated set of features of the weak perspective camera are further refined using a Long Short Term Memory (LSTM) to obtain final estimates of shape and motion of body of the one or more persons in the monocular video.

3. The method of claim 1, wherein the plurality of spatial features are Continuous Surface Embeddings (CSE), and wherein the CSE represents dense correspondences of body of the one or more persons across the plurality of frames.

4. The method of claim 1, wherein the body-aware feature extractor is a pre-trained Continuous Surface Embeddings (CSE) encoder.

5. The method of claim 1, wherein performing the temporal aggregation of the plurality of spatial features of body and the initial estimates of the body shape, the pose of the one or more persons, and the set of features of the weak perspective camera obtained from each of the plurality of frames over the plurality of time windows comprises:
computing normalized self-similarity matrices for (i) the plurality of spatial features, (ii) the initial estimates of the body shape and pose of the one or more persons, and (iii) the initial estimates of the weak perspective camera, using a multi-layer perceptron;
computing one or more self-attention maps of the plurality of spatial features and the initial estimates of the weak perspective camera; and
concatenating the normalized self-similarity matrices and the one or more self-attention maps to obtain a plurality of spatio-temporal features associated with each of the plurality of frames at each of the plurality of time windows.

6. A system comprising:
a memory storing instructions;
one or more communication interfaces; and
one or more hardware processors coupled to the memory via the one or more communication interfaces, wherein the one or more hardware processors are configured by the instructions to:
obtain a monocular video of one or more persons captured by a weak perspective camera, wherein the monocular video comprises of a plurality of frames captured at a plurality of time windows;
extract a plurality of spatial features of body of the one or more persons from the plurality of frames using a body-aware feature extractor;
obtain one or more initial estimates of a) body shape of the one or more persons, b) pose of the one or more persons, and c) a set of features of the weak perspective camera from each of the plurality of frames;
perform temporal aggregation of the plurality of spatial features of body and the initial estimates of the body shape, the pose of the one or more persons, and the set of features of the weak perspective camera obtained from each of the plurality of frames over the plurality of time windows to obtain a plurality of spatio-temporal features associated with each of the plurality of frames over each of the plurality of time windows; and
predict an updated body shape of the one or more persons, an updated pose of the one or more persons, and an updated set of features of the weak perspective camera for each of the plurality of frames based on the associated plurality of spatio-temporal features.

7. The system of claim 6, wherein the updated body shape of the one or more persons, the updated pose of the one or more persons, and the updated set of features of the weak perspective camera are further refined using a Long Short Term Memory (LSTM) to obtain final estimates of shape and motion of body of the one or more persons in the monocular video.

8. The system of claim 6, wherein the plurality of spatial features are Continuous Surface Embeddings (CSE), and wherein the CSE represents dense correspondences of body of the one or more persons across the plurality of frames.

9. The system of claim 6, wherein the body-aware feature extractor is a pre-trained Continuous Surface Embeddings (CSE) encoder.

10. The system of claim 6, wherein performing the temporal aggregation of the plurality of spatial features of body and the initial estimates of the body shape, the pose of the one or more persons, and the set of features of the weak perspective camera obtained from each of the plurality of frames over the plurality of time windows comprises:
computing normalized self-similarity matrices for (i) the plurality of spatial features, (ii) the initial estimates of the body shape and pose of the one or more persons, and (iii) the initial estimates of the weak perspective camera, using a multi-layer perceptron;
computing one or more self-attention maps of the plurality of spatial features and the initial estimates of the weak perspective camera; and
concatenating the normalized self-similarity matrices and the one or more self-attention maps to obtain a plurality of spatio-temporal features associated with each of the plurality of frames at each of the plurality of time windows.

11. One or more non-transitory machine-readable information storage mediums comprising one or more instructions which when executed by one or more hardware processors cause:
obtaining a monocular video of one or more persons captured by a weak perspective camera, wherein the monocular video comprises of a plurality of frames captured at a plurality of time windows;
extracting a plurality of spatial features of body of the one or more persons from the plurality of frames using a body-aware feature extractor;
obtaining one or more initial estimates of a) body shape of the one or more persons, b) pose of the one or more persons, and c) a set of features of the weak perspective camera from each of the plurality of frames;
performing temporal aggregation of the plurality of spatial features of body and the initial estimates of the body shape, the pose of the one or more persons, and the set of features of the weak perspective camera obtained from each of the plurality of frames over the plurality of time windows to obtain a plurality of spatio-temporal features associated with each of the plurality of frames over each of the plurality of time windows; and
predicting an updated body shape of the one or more persons, an updated pose of the one or more persons, and an updated set of features of the weak perspective camera for each of the plurality of frames based on the associated plurality of spatio-temporal features.

12. The one or more non-transitory machine-readable information storage mediums of claim 11, wherein the updated body shape of the one or more persons, the updated pose of the one or more persons, and the updated set of features of the weak perspective camera are further refined using a Long Short Term Memory (LSTM) to obtain final estimates of shape and motion of body of the one or more persons in the monocular video.

13. The one or more non-transitory machine-readable information storage mediums of claim 11, wherein the plurality of spatial features are Continuous Surface Embeddings (CSE), and wherein the CSE represents dense correspondences of body of the one or more persons across the plurality of frames.

14. The one or more non-transitory machine-readable information storage mediums of claim 11, wherein the body-aware feature extractor is a pre-trained Continuous Surface Embeddings (CSE) encoder.

15. The one or more non-transitory machine-readable information storage mediums of claim 11, wherein performing the temporal aggregation of the plurality of spatial features of body and the initial estimates of the body shape, the pose of the one or more persons, and the set of features of the weak perspective camera obtained from each of the plurality of frames over the plurality of time windows comprises:

computing normalized self-similarity matrices for (i) the plurality of spatial features, (ii) the initial estimates of the body shape and pose of the one or more persons, and (iii) the initial estimates of the weak perspective camera, using a multi-layer perceptron;

computing one or more self-attention maps of the plurality of spatial features and the initial estimates of the weak perspective camera; and concatenating the normalized self-similarity matrices and the one or more self-attention maps to obtain a plurality of spatio-temporal features associated with each of the plurality of frames at each of the plurality of time windows.

\* \* \* \* \*